US005264124A

United States Patent [19]

Nemedi

[11] Patent Number: 5,264,124

[45] Date of Patent: Nov. 23, 1993

[54] SEGMENTED CENTRIFUGAL SEPARATOR SCROLL HOUSING WITH REMOVABLE SCROLL SEGMENTS

[75] Inventor: William D. Nemedi, Vicksburg, Mich.

[73] Assignee: Inter-Source Recovery Systems, Inc., Kalamazoo, Mich.

[21] Appl. No.: 831,176

[22] Filed: Feb. 5, 1992

[51] Int. Cl.[5] .............................................. B01D 33/10

[52] U.S. Cl. ................................ 210/380.1; 210/373; 494/36; 494/79; 494/901

[58] Field of Search ........................ 494/26, 36, 43–45, 494/50, 51, 56, 63–64, 67, 74, 79, 81, 901; 210/298, 360.1, 369, 372–375, 377, 380.1, 382, 405, 456; 366/35, 38, 50, 64, 66, 318, 319

[56] References Cited

U.S. PATENT DOCUMENTS

| | | | |
|---|---|---|---|
| 1,650,427 | 11/1927 | Carpenter | 210/369 |
| 1,961,226 | 6/1934 | Keatley et al. | 210/369 |
| 3,366,318 | 1/1968 | Steimel | 494/901 X |
| 4,122,014 | 10/1978 | Weininger et al. | 494/36 X |
| 4,135,659 | 1/1979 | Derton et al. | 494/43 X |
| 4,137,176 | 1/1979 | Dudley et al. | 210/375 |
| 4,186,096 | 1/1980 | Areaux et al. | 210/377 |
| 4,186,097 | 1/1980 | Dudley et al. | 210/377 |
| 4,253,960 | 3/1981 | Dudley et al. | 494/901 X |
| 4,298,476 | 11/1981 | Dudley | 494/79 X |
| 4,310,417 | 1/1982 | Dudley et al. | 210/375 |
| 4,936,822 | 6/1990 | Nemedi | 494/43 |

FOREIGN PATENT DOCUMENTS

| | | | |
|---|---|---|---|
| 71012 | 2/1983 | European Pat. Off. | 494/36 |
| 264374 | 1/1927 | United Kingdom | 366/64 |
| 1601381 | 11/1981 | United Kingdom | 494/43 |

*Primary Examiner*—Harvey C. Hornsby
*Assistant Examiner*—Charles Cooley
*Attorney, Agent, or Firm*—Marshall, O'Toole, Gerstein, Murray & Borun

[57] ABSTRACT

A scroll liner for use in the discharge housing of a centrifugal separator device. The scroll liner comprises a plurality of segments which are replaceable in the event of excessive wear. The segments are of a length which is less than the space between adjacent blades having blade portions located in the discharge housing such that a segment can be removed from the separator device in the space formed by adjacent blades.

9 Claims, 2 Drawing Sheets

SEGMENTED CENTRIFUGAL SEPARATOR SCROLL HOUSING WITH REMOVABLE SCROLL SEGMENTS

RELATED APPLICATION

This application is related to application Ser. No. 07/831,168 filed Feb. 5, 1992 by William D. Nemedi entitled "Replaceable Wrap For Scroll Housing In Centrifugal Separator."

FIELD OF INVENTION

This invention relates generally to a centrifugal separator for separating lubricating and other fluids from metal or other scrap materials and more particularly to an improved scroll liner for use in the discharge housing of the separator.

BACKGROUND OF THE INVENTION

Centrifuge systems for continuously feeding and removing liquid from metal chips, shavings or other material impregnated with lubricating or other fluids are known in the prior art. As used herein, these materials are referred to as "chips." Such systems are illustrated, for example, in Nemedi U.S. Pat. No. 4,936,822, Dudley U.S. Pat. No. 4,137,176 and Areaux U.S. Pat. No. 4,186,096. In these systems, the centrifugal separator unit includes a plurality of blades attached to the bottom wall of a rotatable separator bowl disposed inside the centrifugal parts separator unit. The bowl and blades rotate about a vertical axis during operation causing the mixture of the chips and lubricant to move upward along the interior side of the bowl. The centrifuged mixture moves past a screen at the upper edge of the bowl at which location lubricant is separated out from the chips. The rotating blades or other suitable means in the centrifugal separator serve to generate air movement sufficient to blow or pull the chips or other materials through and out of an annular-shaped discharge housing to a further location where the separated materials are collected.

When the separated chips reach the discharge housing following lubricant removal, they are relatively dry, most of the lubricant having been removed. In some instances, the chips are moving at speeds upwards in excess of 100 miles per hour. Due to the high speeds and the dryness of the chips, excessive wear occurs throughout at least the annular-shaped portion of the discharge housing.

As described in Nemedi '822 patent, depending upon the use of the separator device, a problem sometimes arises due to the wear of the separator parts. In the annular-shaped portion of the discharge housing located above the lubricant discharge area, the chips scrape the sides of the housing as the chips and materials move toward the exit discharge opening. Scraping of the sides causes adverse wear in at least the annular-shaped portion of the discharge housing. With prior art centrifugal separating devices, it generally is necessary to dismantle a substantial portion of the machine to remove and replace a worn discharge housing or its components. Replacement is often times a relatively expensive, time consuming procedure because of the down time of the machine, the cost of the replacement parts, and the labor of mechanics required to perform the replacement operation.

What is desired is to have a centrifugal separator device wherein the worn or damaged portion of the discharge housing can be relatively easily replaced without the need for disassembling a substantial portion of the separator device. Accordingly, it is a general object of the present invention to provide a centrifugal separator apparatus having an improved discharge housing wherein at least the scroll portion of the housing can be relatively readily replaced.

SUMMARY OF THE INVENTION

The invention disclosed and claimed herein serves to obviate the problems associated with conventional centrifugal separator devices and to achieve the desires sought in replacing worn portions of the discharge housing. Briefly, the present invention relates to a centrifugal separator apparatus of the type which comprises: a rotatable cone-shaped centrifugal separator bowl, a plurality of angularly spaced blades attached to the interior side of the bowl, an annular screen located at the upper edge of the bowl through which lubricant to be separated may flow, and, a discharge housing disposed above the screen and which surrounds the upper ends of the rotatable blades. The chip discharge housing often referred to as a scroll housing is annular-shaped and includes a straight discharge section having an exit opening for the discharge of chips from the separator device following chip lubricant separation.

In accordance with the invention disclosed and claimed herein, the interior surface of the discharge or scroll housing is lined with a plurality of releasably secured scroll segments which form a scroll liner. The arcuate length of the individual segments is less than the spacing between adjacent blades which extend upwardly in the bowl contiguous to the annular-shaped portion of the scroll housing. Inasmuch as the removable scroll segments are of a particular length, one or more segments may be relatively easily removed through the spaces between adjacent blades. This dimensional relationship between the length of a scroll segment and the space between adjacent blades provides for a significant advantage in that it obviates the need to dismantle the blades or other components of the separator device in order to replace the damaged or worn portion of the scroll liner. Rather, according to the novel apparatus and method of the present invention, a worn scroll segment can be removed and a new scroll segment can be installed without any blade removal and in a relatively short period of time. As a result, replacement of worn or damaged sections of the annular-shaped portion of the discharge housing can be accomplished relatively efficiently. Moreover, by having a replaceable liner formed of a plurality of segments, the discharge housing life is extended.

DESCRIPTION OF THE DRAWINGS

Further advantages of the invention will become apparent upon a reading of the following detailed description taken in conjunction with the accompanying drawings in which.

DETAILED DESCRIPTION

Figure 1:
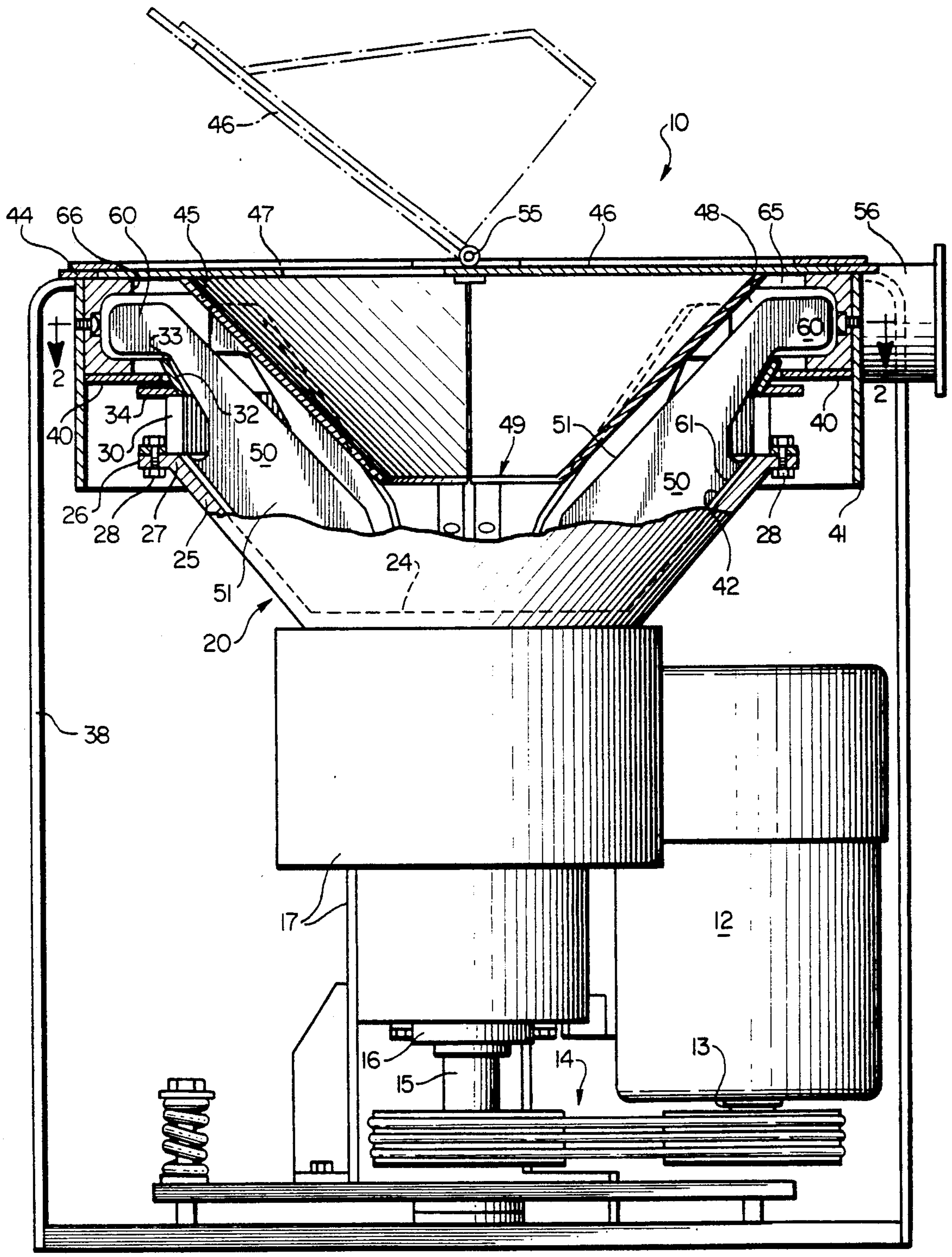
FIG. 1 shows a front, partial section view of a centrifugal separator apparatus including the replaceable annular-shaped portion of the discharge housing.

Referring to the drawings and particularly to FIG. 1, there is shown centrifugal separator device 10 which includes motor 12 which has a drive shaft 13 connected by belt and pulley drive assembly 14 to one end of centrifugal separator drive shaft 15. Shaft 15 is disposed within bearing assembly 16.

The remaining end of drive shaft 15 is secured to a substantially cone or bell-shaped separator bowl 20. Upon actuation of motor 12, bowl 20 connected to shaft 15 rotates. Cylindrical housing 17 encloses the lower end of the bowl 20 and shaft 15.

Bottom wall 24 of separator bowl 20, which has inner and outer wall surfaces, extends outwardly and terminates in bowl wall 25. Wall 25 extends vertically upwardly and outwardly with a mounting flange 26 located at upper end 27 of bowl wall 25. A substantially cylindrical separator screen 30, which is defined by a wire mesh or the plurality of spaced, elongated bars forming narrow openings, or the like, extends upwardly from flange 26. Screen 30 permits discharge of lubricating liquid separated from the metal chips in the centrifuged separator bowl, the lubricant passing through the mesh or other openings in screen 30 while the metal chips are centrifuged upwardly past screen 30. Liquid discharged through the openings in screen 30 will be collected in a suitable collection chamber, not shown, preferably disposed within casing chamber 38 in which the parts of the centrifugal separator device are disposed. Screen 30 is secured to flange 26 by means of a plurality of suitable fasteners 28.

Conical portion 32 is secured to the upper edge of screen 30 and extends radially outward in an upward direction to dispensing edge 33. A radially extending flange 34 is secured to the centrifugal separator bowl 20 intermediate the juncture between conical portion 32 and screen 30. A radially inwardly directed flange 40 is secured to cylindrical outer wall support member 41 which depends from and is attached to the top of chamber 38 as seen in FIG. 1.

Cover 44 is fixed in any desired manner to the upper edge of chamber 38. In the particular embodiment of FIG. 1, cover 44 includes an upper conical member 45 which is fixedly attached to and depends from cover 44. Conical member 45 comprises two pivotable cone-shaped portions 46, 47 whereby the outer wall of conical member 45 defines the inner wall of annular chip collecting chamber 48 and the cylindrical support wall member 42 defines the outer wall thereof.

Cone 45 converges in a downward direction to a location spaced immediately above and within separator bowl 20. Opening 49 at the bowl lower end of conical member 45 defines an air inlet as well as a material inlet for a mix of lubricant plus chips, shavings or the like into centrifuge separator device 10. Spaced blade assemblies 50 are securely fastened to and rotate with rotatable separator bowl 20.

In a typical operation, metal chips and lubricating fluids to be separated are delivered to the top of centrifuge 10 from a discharge end of a separator chute, not shown, which is well known in the prior art. The mixed chips and fluids enter centrifuge 10 and pass through opening 49 at the bottom of conical member 45. The fluid mixed with the metal chips passes into rotating separator bowl 20 where the materials to be separated are centrifuged outwardly and travel upwardly along both the internal surface of bowl wall 25 and the leading surfaces of the rotating blades in blade assemblies 50. The lubricating fluid separates from the chips and passes through screen 30 to a collection chamber (not shown) where the lubricating fluid is collected. The rotating blades also serve to draw or pull fluid such as air downwardly through opening 49 in cone 45. The air then passes upwardly through the space between the outside surface of cone 45 and bowl 20. Following separation from the lubricating fluid, metal chips, shavings and the like, continue to be directed upward by the centrifugal action of the separating device past screen 30 and dispensing edge 33 where the separated chips and shavings are directed out of discharge chamber 48 and exit chute 56 to a collecting site.

Separator bowl 20 is shown with eight spaced blade assemblies 50 disposed within, the blades preferably being releasably fixed to the bowl. As disclosed in Nemedi U.S. Pat. No. 4,936,822, the disclosure of which is incorporated herein by reference, each blade assembly 50 includes a pad 61 (FIG. 1), which is secured to the bowl 20 and extends at right angles to blade 51. Blade 51 projects upward beyond the location of screen 30 into chamber 48 of discharge housing 65 as shown in FIG. 1. Each blade 51 includes a radially extending paddle 60 at its upper end, which is disposed within the scroll housing described hereafter.

Figure 2:
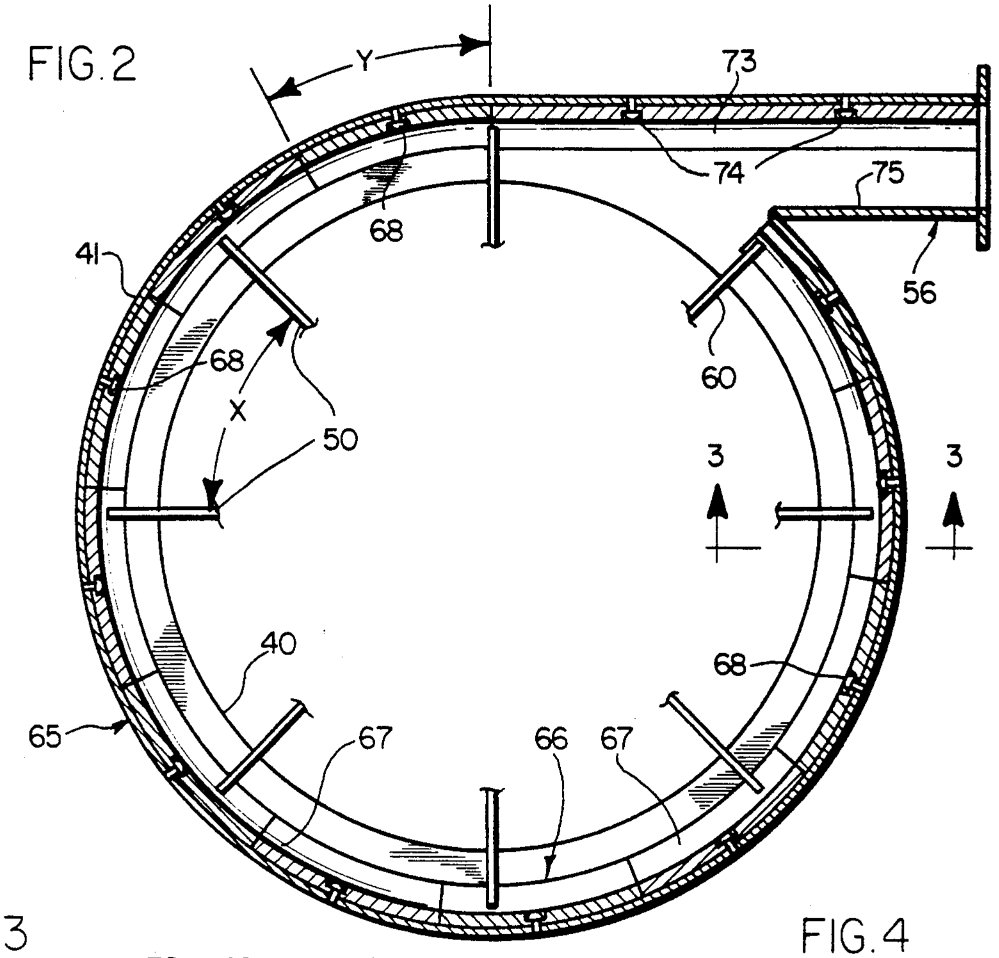
FIG. 2 shows a top section view taken along lines 2—2 in FIG. I.

The air movement within the scroll or discharge chamber 48 plus blade paddles 60 serve to direct or otherwise move the chips through the annular-shaped portion of discharge chamber 48 and exit chute 56. As best shown in FIGS. 1 and 2, discharge chamber 48 comprises annular-shaped support walls 40, 41 which support a plurality of annular or scroll segments 67. As each blade 51 and its respective paddle 60 rotates in a clockwise direction, air and metal chips are swept, blown or pulled past scroll segments 67 and out discharge outlet 56.

It has been found that considerable wear occurs in the annular-shaped portion of the discharge chamber 48 of discharge housing 65. The metal chips, which are relatively free of lubricant, scrape along the sides of the annular-shaped portion of housing 65 as they move to the straight chip discharge chute 56. In prior art constructions, when extensive wear occurred in this portion of the housing, it generally necessitated the dismantling of blade assemblies 50 and removing cone 45 and other machine parts in order to remove and replace the damaged discharge housing 65.

To reduce the time and expense required to repair or replace a worn scroll or annular-shaped portion in accordance with the invention disclosed and claimed herein, the annular-shaped portion of discharge housing 65 is made up of a plurality of scroll segments 67. Segments 67 form an annular wall or lining 66 which is seated on support wall 40 and fastened to the interior surface of support wall 41 so that the scroll or annular wall 66 is contiguous to the outer edges of blade paddles 60. Each arcuate segment 67 is fastened to wall 41 by recessed bolts 68. As shown more clearly in the embodiment of FIG. 2, eleven identical arcuate scroll segments 67 are provided, the segments being mounted in close or abutting side-by-side arrangement. It is appreciated other arrangements of segments could be utilized, if desired, other than utilizing eleven segments. For example, an arrangement using ten segments or fourteen segments could be employed depending upon the overall size of a centrifugal separator or wringer and the number of blade assemblies utilized in a particular application.

Figure 3:
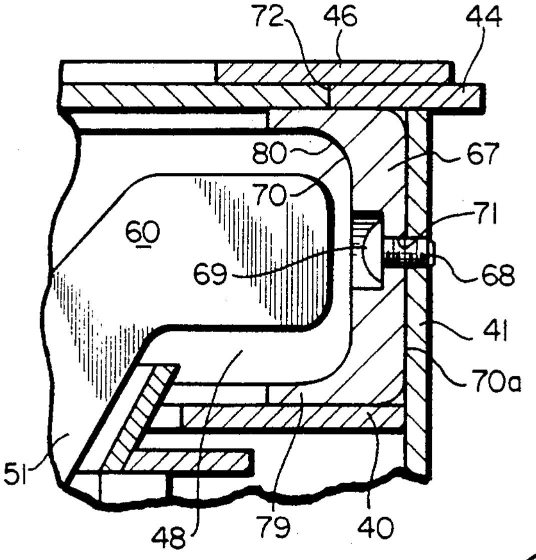
FIG. 3 shows an enlarged fragmentary section view taken along lines 3—3 in FIG. 2 and shows a top portion of a blade and the scroll housing of FIG. 1.

Referring to FIG. 3, one or more counterbored holes 71 is formed through the center of each scroll segment 67 and bolt 68 extends through the hole(s) where it is threaded into support wall 41. Head 69 of screw 68 is seated in the counterbore as shown in FIG. 3 whereby it is disposed substantially out of the path of chips moving within the discharge chamber. Further, to the extent and in the event small chips should lodge in the counterbore over the top of screw head 69, they serve to prevent abrasion of the screw head.

As best shown in FIG. 3, each arcuate scroll segment 67 has, in vertical cross-section, a substantially symmetrically curved, reverse C-shape on its interior (or left side as shown in FIG. 3) side 70. It is appreciated that interior segment side 70 could employ some surface other than a C-shape. What is required is that the outer edges of paddles 60 are somewhat contiguous to scroll segment side 70 and that they are positioned relative to one another whereby the maximum desired air flow and chip movement is obtained in the scroll or annular-shaped portion of the discharge housing 65.

Screw hole 71 preferably is located halfway between the top and bottom of segment 67. The exterior or right side wall 70*a* (FIG. 3) of each segment preferably has radiused corners and seats snugly within the space formed by walls 40, 41 and cover 44 as illustrated in FIGS. 1 and 3. Segment 67 preferably is symmetrical along its height. Accordingly, in the event the lower interior section 79 of segment portion 67 wears more than the upper section 80 scroll, segment 67 may be removed, rotated and reinstalled whereby the lesser worn section 80 of segment 67 forms the lower interior section of segment 67.

Referring to FIG. 2, eight blade assemblies 50 are shown, each assembly being spaced at a 45° interval from an adjacent blade assembly such that an arcuate length X, as shown in FIG. 2, is formed between blades 51 of adjacent assemblies 50. The arcuate angle encompassed by each segment 67 of the eleven (11) arcuate segments is, in this example, approximately 29° so as to form an arcuate length Y (FIG. 2) which segment length is less than the arcuate length X. As a consequence, a worn scroll segment 67 may easily be removed from the housing by positioning an adjacent pair of spaced blades 51 so that each blade 51 and paddle 60 in the pair is spaced opposite a side of a segment 67 to be removed from discharge housing 65. Screw(s) 68 are released and the worn segment 67 is removed from walls 40, 41 through the space between blades 51 and paddles 60. This spacing and procedure serves to eliminate the need to dismantle discharge housing 65 and/or the blade assemblies 50 as is generally required in a conventional wringer or centrifuge device when the annular-shaped portion of the discharge housing is damaged. After a segment 67 has been removed, another segment 67 can be installed. The process of replacing scroll segments 67 at different locations on the annular-shaped housing can be repeated as may be required for a particular application.

As shown in FIG. 3, the upper section 80 of arcuate scroll segment 67 extends outward from the vertical portion of segment 67 and covers the joint 72 formed between cover 44 and cone portion 45 thereby forming a seal between various housing parts.

In addition to utilizing the arcuate-shaped segments 67, at least one straight discharge housing segment 73 (FIG. 2) may be provided in discharge housing 65 contiguous to the chip discharge port 56. Segment 73 preferably has the same reverse C cross-sectional shape as the segments 67. It is releasably fixed to the support wall 41 by one or more screws 74 which are recessed in a suitable counterbore. It is expected that the inner wall 75 of chute 56 need not require a segment because chips generally are swept across the outer wall of segment 73 upon discharge from centrifugal separator 10. It is appreciated, however, that one could utilize a segment 73 to extend along the length of the inner wall 75.

Segments 67 preferably are substantially identical in size; however, if desired, they can vary in size and shape. The segments my be formed of a hard wear resistant material, which material generally is not suitable for segment support walls 40, 41 and cover 44. They also can be machined to form a smooth and efficient shape, other than the reverse C-shape disclosed herein. The shape must be suitable to conform to and provide the desired clearance between the inner wall of a segment 67 and the outer edges of blade paddles 60. The segments can be made of a cast or fabricated steel material. Preferably, the segments are cast steel following which they can be heat treated to ASTM A 148-105-85 having a nominal Brinell hardness of 248 or A 148-115-95 having a nominal Brinell hardness of 285.

Figure 4:
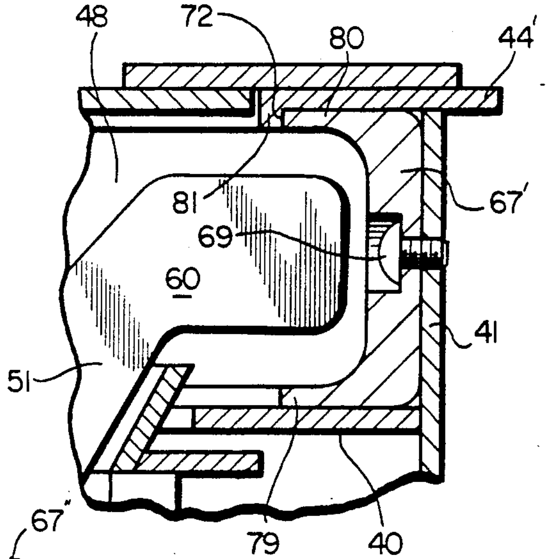
FIG. 4 shows a view similar to FIG. 3 but shows an alternative embodiment of the present invention; and, FIG. 5 shows a fragmentary section view showing another alternative embodiment of the present invention.

The embodiment of the invention shown in FIG. 4 is similar to that of FIG. 3. In the embodiment of FIG. 4, however, cover 44′ extends radially inwardly a greater distance than the cover distance shown in FIG. 3. The cover 44′ includes a downwardly extending flange or lip 81 which is adapted to overlie the upper interior corner 72 of segment 67′ when a segment 67′ is positioned in place in the scroll 66. Flange 81 forms a detent which assists in maintaining the upper portion 80 of segments 67 in a fixed position.

Figure 5:
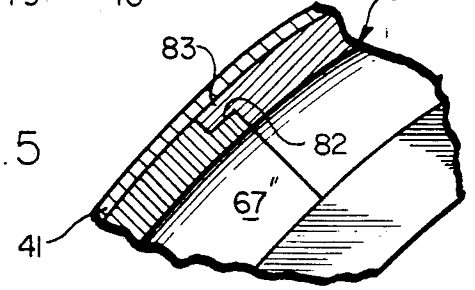

In the embodiment shown in FIG. 5, the adjoining vertical edges of adjacent segments 67″ are providing with mating recesses 82 and flanges 83. Consequently, there is an overlap along the vertical length of opposed mating edges which serves to hold adjacent segments 67″ in position. While all of the arcuate segments 67″ are identical, in this embodiment, the segments cannot be turned upside down as can the segments 67 and 67′ disclosed in embodiments 3 and 4 which do not utilize the flanges and recesses 82, 83.

While one screw 68 has been shown for locking various segments 67 to chamber wall 41 to form a unitary scroll lining 66 which lines discharge chamber 48, it is appreciated that a plurality of screws 68 could be employed for each segment.

Similarly, while scroll segments 67 have been shown in which the interior surface shape is a reverse C shape, it is appreciated other shapes may be utilized depending upon a particular application and the shape of the paddles 60. Moreover, while a segment 67 has been shown in which the upper and lower portions 70, 80 are symmetrical, it is appreciated that asymmetrical portions could be utilized.

Further, while the invention has been shown and described with a blade assembly installation shown in the Nemedi '822 patent, it is appreciated that other blade arrangements could be utilized as shown, for example, in the Dudley U.S. Pat. Nos. 4,137,176, 4,253,960 and 4,298,476.

It will be apparent from the foregoing that a novel and improved discharge housing has been provided for a centrifugal parts separator or wringer. The segments may be relatively easily removed, replaced or turned over without dismantling the machine. Further, the segments may be made of a hard wear resistant material and shaped, as desired, to cooperate with contiguous rotating blades to provide an efficient removal of chips or other materials.

While one or more embodiments of the invention have been herein illustrated and described in detail, it will be understood that modifications and variations thereof may be effected without departing from the spirit of the invention and the scope of the appended claims.

What is claimed is:

1. A centrifugal separator device for separating chips from fluids, said separator comprising a discharge housing which receives chips adapted to travel through said discharge housing;

- a plurality of spaced blade assemblies each of which includes a blade having at least a portion thereof which is adapted to rotate in said discharge housing, with one blade of one assembly being adjacent a blade of another assembly;
- means for rotating said blade assemblies whereby said blade portions rotate in said discharge housing to cause chips in said housing to travel through said discharge housing;
- said discharge housing comprising an annular shape and having at least one exit opening therein through which chips exit;
- a scroll lining releasably secured within said discharge housing for contact with chips traveling through said housing, said lining being positioned contiguous to said blade portions located within said discharge housing;
- said scroll lining comprises a plurality of removable arcuate scroll segments, each segment being releasably fastened to said discharge housing; and,
- each scroll segment is of a length which is less than the length between a pair of adjacent blades wherein said segments can be installed without need for removing the blades of said blade assemblies.

2. A centrifugal separator device as set forth in claim 1 wherein said scroll segments are identical.

3. A centrifugal separator device as set forth in claim 1 wherein a plurality of said scroll segments are symmetrical about a vertical axis of the separator device.

4. A centrifugal separator device as set forth in claim 1 wherein each segment has two ends and includes a groove formed on one of said two segment ends and a flange formed on said remaining segment end whereby said groove on one segment is adapted to mate with said flange of an adjacent scroll segment.

5. A centrifugal separator device as set forth in claim 1 wherein said discharge housing further comprises a discharge outlet which includes at least one straight section having an exterior wall and interior wall, and a straight segment releasably secured to and covering at least a portion of said interior wall of said discharge outlet.

6. A centrifugal separator device as set forth in claim 5, wherein said straight segment has the same cross-sectional shape as that of said arcuate scroll segments.

7. A centrifugal separator device as set forth in claim 1 wherein each of said segments is secured to said discharge housing by a fastener means, said fastener means includes a bolt and said fastener means extends through a counterbored hole in said segment and said bolt having a head recessed in said counterbored hole.

8. A centrifugal separator device as set forth in claim 1 wherein said blade portions in said discharge housing have contours and said segments have interior contours which substantially correspond to the contours of the blade portions disposed in said discharge housing.

9. A centrifugal separator device for separating lubricant from metal chips and the like, said device including a discharge housing having a scroll liner therein, said scroll liner being adapted to contact metal chips which are centrifuged or blown through said discharge housing to a discharge opening;

said scroll liner including:

- a plurality of segmented, arcuate-shaped segments each of which is releasably disposed within said discharge housing; and,
- a plurality of angularly spaced rotatable blades mounted contiguous to said segments, each of said segments having an arcuate length which is less than the arcuate length between a pair of adjacent blades wherein said segments can be installed without need to remove said rotatable blades.

* * * * *